(12) United States Patent
Brown

(10) Patent No.: US 6,189,492 B1
(45) Date of Patent: Feb. 20, 2001

(54) AUTOMOTIVE FAN SHROUD AND METHOD OF MAKING

(75) Inventor: Daniel J. Brown, Harrison Township, MI (US)

(73) Assignees: Custom Molder, Inc., Durham, NC (US); LaBelle-Suomela, Inc., Redford Township, MI (US)

(*) Notice: Under 35 U.S.C. 154(b), the term of this patent shall be extended for 0 days.

(21) Appl. No.: 09/287,908

(22) Filed: Apr. 7, 1999

(51) Int. Cl.[7] ............................................. F01P 7/14
(52) U.S. Cl. ............................................... 123/41.49
(58) Field of Search ........................... 123/41.49, 41.51, 123/41.57; 29/888.028, 888.01

(56) References Cited

U.S. PATENT DOCUMENTS 3,692,004 * 9/1972 Tangue et al. ............... 123/41.57
4,018,297 * 4/1977 Haupt .............................. 180/54 A
5,971,062 * 10/1999 Sadr et al. ...................... 165/104.32

FOREIGN PATENT DOCUMENTS 8-260968  * 10/1996  (JP).

OTHER PUBLICATIONS

Oct. 27, 1997 Article entitled "Blow Molding Integrates Three Auto Parts", from the "Plastics News".

* cited by examiner

Primary Examiner—Henry C. Yuen
Assistant Examiner—Katrina B. Harris
(74) Attorney, Agent, or Firm—Olive & Olive, P.A

(57) ABSTRACT

The invention disclosed herein provides an automotive fan shroud and method of making. The invention fan shroud includes an integral liquid reservoir at its left and right upper corners. The fan shroud has separate upper and lower halves formed by injection molding. The upper and lower halves have interengaging flanges for being assembled to each other to form a full fan shroud, thus simplifying assembly and subsequent servicing. The liquid reservoirs are initially formed with open tops that are closed by the insertion of a fixedly attached reservoir cover, each cover having a filler neck and a cap.

20 Claims, 3 Drawing Sheets

AUTOMOTIVE FAN SHROUD AND METHOD OF MAKING

BACKGROUND OF THE INVENTION

1. Field of the Invention

This invention relates to an automotive fan shroud, and more particularly to an automotive fan shroud that is integrally formed with automotive liquid reservoirs.

2. Background of the Invention

Automotive engines continually generate heat as they operate due to the combustion of fuel in the cylinders. A liquid coolant is circulated through the engine block by a pump in order to absorb and remove a portion of the heat from the engine block and maintain the engine temperature within a safe operating range. The radiator has a plurality of tubes configured to receive and circulate the heated liquid. A flow of ambient air is drawn through the radiator by a fan so that the ambient air contacts the exterior surface of the liquid coolant-carrying tubes to remove some of the heat from the liquid coolant. The radiator tubes are spaced apart so that ambient air can flow through the spaces and across the tubes to cool the tubes. The liquid coolant is returned to the engine block as a partly cooled liquid. The fan is typically positioned in an automobile engine compartment adjacent the rear side of the automotive radiator, or heat exchanger. The effectiveness of the automotive fan to cause the air flow to pass over the radiator tubes is enhanced by use of a fan shroud, or housing, to draw the air flow through the radiator.

The vertical front and back surfaces of an automotive radiator are typically rectangular in shape, while the fan is round. The known fan shrouds for automotive fans accommodate this change in opening shape with a fan opening that is round so as to circumferentially surround the fan and a radiator opening that is rectangular to match the shape of the radiator. There are four corner segments situated radially beyond the periphery of the fan and within the rectangular shape of the radiator that are substantially triangular in shape. In the known fan shroud configurations, these triangular corner segments are essentially space that is empty, but could hold another component of the engine compartment.

Modem automotive engine compartments are getting more crowded as the car's or truck's transmission and drive components are placed in close proximity to the front wheels and as more luxury features and air pollution control equipment are added. As used herein, the term automotive encompasses passenger cars, trucks, and buses. Space within the engine compartment is at a premium. Thus, the unused space of the triangular corner segments of the known fan shrouds is wasted space.

Contemporary automotive fan shrouds are typically formed of plastics resin. Other engine compartment components that are also typically formed of plastics resin are liquid reservoirs, for example reservoirs used to contain engine coolant and windshield washer liquid. Known engine coolant reservoirs, also known as degassing chambers, have been formed with internal baffles to subdivide the reservoir into small cells to minimize liquid agitation and foaming. Assembly of the fan shroud into the engine compartment involves labor. Assembly of the liquid reservoirs into the engine compartment involves additional labor.

The present invention recognizes that combining the liquid reservoirs with the fan shroud would conserve both engine compartment space and assembly labor.

The concept of combining a fan shroud with liquid reservoirs is known. The prior known fan shroud and liquid reservoir combination unit is formed by a process known in the trade as blow molding. A known blow molded fan shroud and liquid reservoir combination is supplied by the McCord Winn Division of Textron Automotive Company of Madison Heights, Mich. Inherent limitations in blow molding make the process of producing a fan shroud having integral liquid reservoirs labor intensive, therefore comparatively expensive. In addition, the finished automotive fan shroud lacks the internal baffles in the engine coolant reservoir, also due to process limitations.

When the automobile is assembled, the fan shroud surrounds the fan and substantially fills the space between the engine block and the radiator. If a problem should arise in the fan, the radiator, the water pump, or other engine components in the area of the fan shroud, access by a mechanic is impeded by the fan shroud. However, removal of the fan shroud is a tedious process, frequently requiring the removal of other components in the vicinity of the fan shroud. It is thus recognized that provision of a fan shroud formed as a split ring would simplify servicing of the assembled engine.

Therefore, it is an object of the present invention to provide a fan shroud combined with a liquid reservoir that includes internal baffles.

It is a further object of the present invention to provide a fan shroud combined with plural liquid reservoirs, at least one of which includes internal baffles.

It is an additional object of the present invention to provide a fan shroud combined with plural liquid reservoirs by a manufacturing process which minimizes labor and cost.

It is a still further object of the present invention to provide a fan shroud formed of multiple parts so as to be installed and removed segmentally.

These and additional objects of the present invention will become more fully understood from the following description and claims.

SUMMARY OF THE INVENTION

The present invention provides an automotive fan shroud that is comprised of upper and lower halves, which when combined serves to draw air flow generated by the fan through the radiator. The two halves are formed with mating edge portions adapted to engage one another. The upper half of the fan shroud incorporates two liquid reservoirs that are located outside the periphery of the fan. The liquid reservoirs are for containing engine coolant liquid and windshield washer liquid.

BRIEF DESCRIPTION OF THE DRAWINGS

In order that the invention will become more clearly understood it is disclosed below in greater detail with reference to the accompanying drawings wherein similar parts are similarly numbered, and in which.

DETAILED DESCRIPTION OF THE INVENTION

Figure 1:
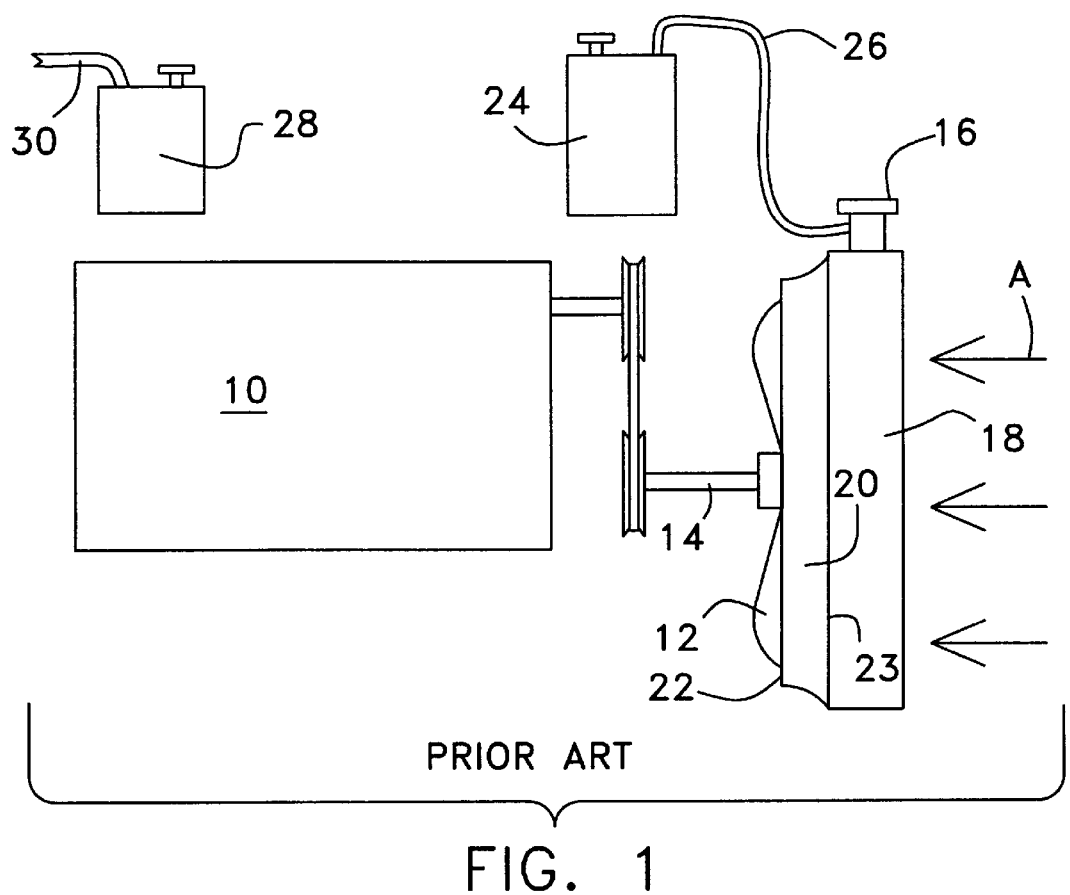
FIG. 1 is a side elevation schematic view showing an automotive engine, a radiator, a cooling fan with a prior art fan shroud, and a pair of conventional liquid reservoirs.

Pursuant to the brief description above, FIG. 1 portrays a typical automotive fan shroud of the prior art in side elevation. Automotive engine 10 is shown schematically positioned adjacent radiator 18 which has a filler cap 16 mounted on its upper surface. A pair of hoses (not shown) are connected between engine 10 and radiator 18 for circulation of a coolant liquid. Cooling fan 12 is mounted between engine 10 and radiator 18 and oriented with its shaft 14 substantially horizontal. Fan shroud 20 is mounted to the rear face 23 of radiator 18 in a position to concentrically surround cooling fan 12 so that as cooling fan 12 rotates, ambient air is caused to be drawn through radiator 18 in the direction shown by arrows A so as to also flow over engine 10 to provide further cooling. It is common for fan 12 to be smaller in diameter than radiator 18 is wide; thus discharge side 22 is shown smaller than rectangular side 23, and fan shroud 20 is appropriately tapered. The body of the automobile, in which engine 10 and other described components are mounted, is not shown for reasons of clarity.

A degas chamber 24, or coolant reservoir, is a separate container that is mounted within the engine compartment in close proximity to radiator 18 and is connected in fluid communication thereto by hose 26. Degas chamber 24 permits excess volume of liquid, caused by the heating of the coolant liquid in engine 10, to escape from radiator 18 and not be wasted. Degas chamber 24 is generally provided with a set of internally mounted antifoaming baffles (not shown).

Referring still to FIG. 1, a further component in the engine compartment of modern automobiles is windshield washer liquid reservoir 28. Windshield washer liquid reservoir 28 is a simple bottle that is connected by means of hose 30 to a set of windshield spray nozzles (not shown). Liquid stored within windshield washer liquid reservoir 28 is pumped to the nozzles and onto the automobile's windshield by a pump (not shown) that may be mounted internally or externally of liquid reservoir 28.

Figure 2:
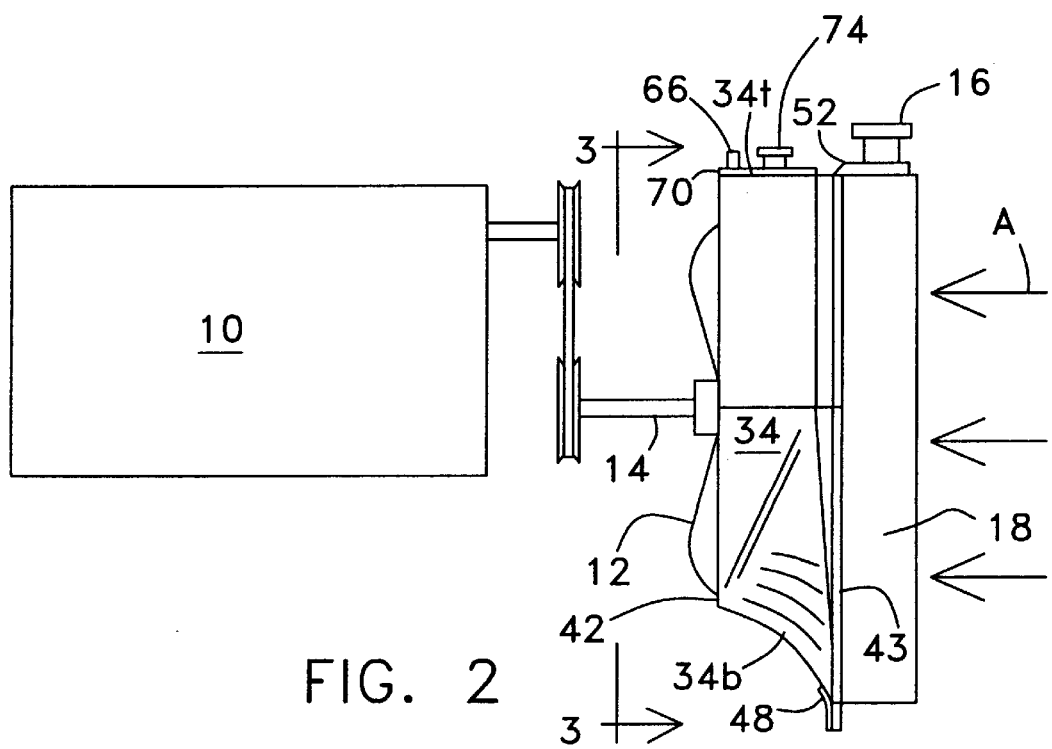
FIG. 2 is a side elevation schematic view of an automotive engine, a radiator, a cooling fan, and the fan shroud of the present invention incorporating a pair of integral liquid reservoirs.

Referring now to FIG. 2, engine 10 is mounted proximate to radiator 18. Filler cap 16 is positioned at the upper portion of radiator 18 to add coolant liquid thereto. Cooling fan 12 is positioned between engine 10 and radiator 18 so as to draw ambient air through radiator 18 in a direction indicated by arrows A. Fan shroud 34 of the present invention is mounted to radiator 18 so as to circumferentially surround fan 12. In side elevation view, fan shroud 34 of the present invention has a horizontal upper surface 34t. Reservoir cover 70 is assembled to horizontal top 34t with a vertically extending filler cap 74 mounted thereto. As seen in side elevation, the lower portion 34b of fan shroud 34 is formed in a curve to provide a gradual transition from round opening 42 (see FIG. 3) to the rectangular portion 43 where fan shroud 34 connects to radiator 18.

Figure 3:
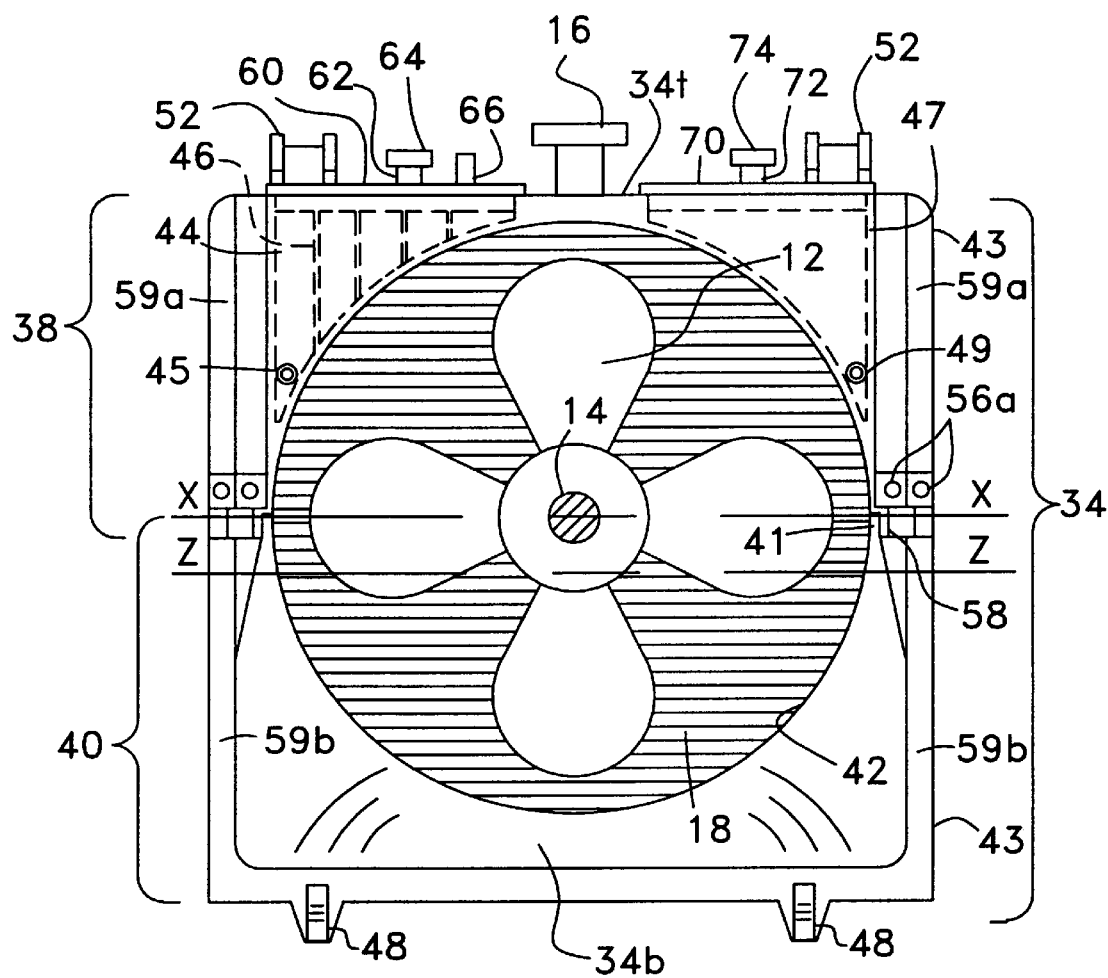
FIG. 3 is an enlarged rear elevation section view of the cooling fan, the fan shroud and integral liquid reservoirs of the invention, and the radiator, with the section taken in the direction of line 3—3 of FIG. 2 through the cooling fan shaft.
Figure 4:
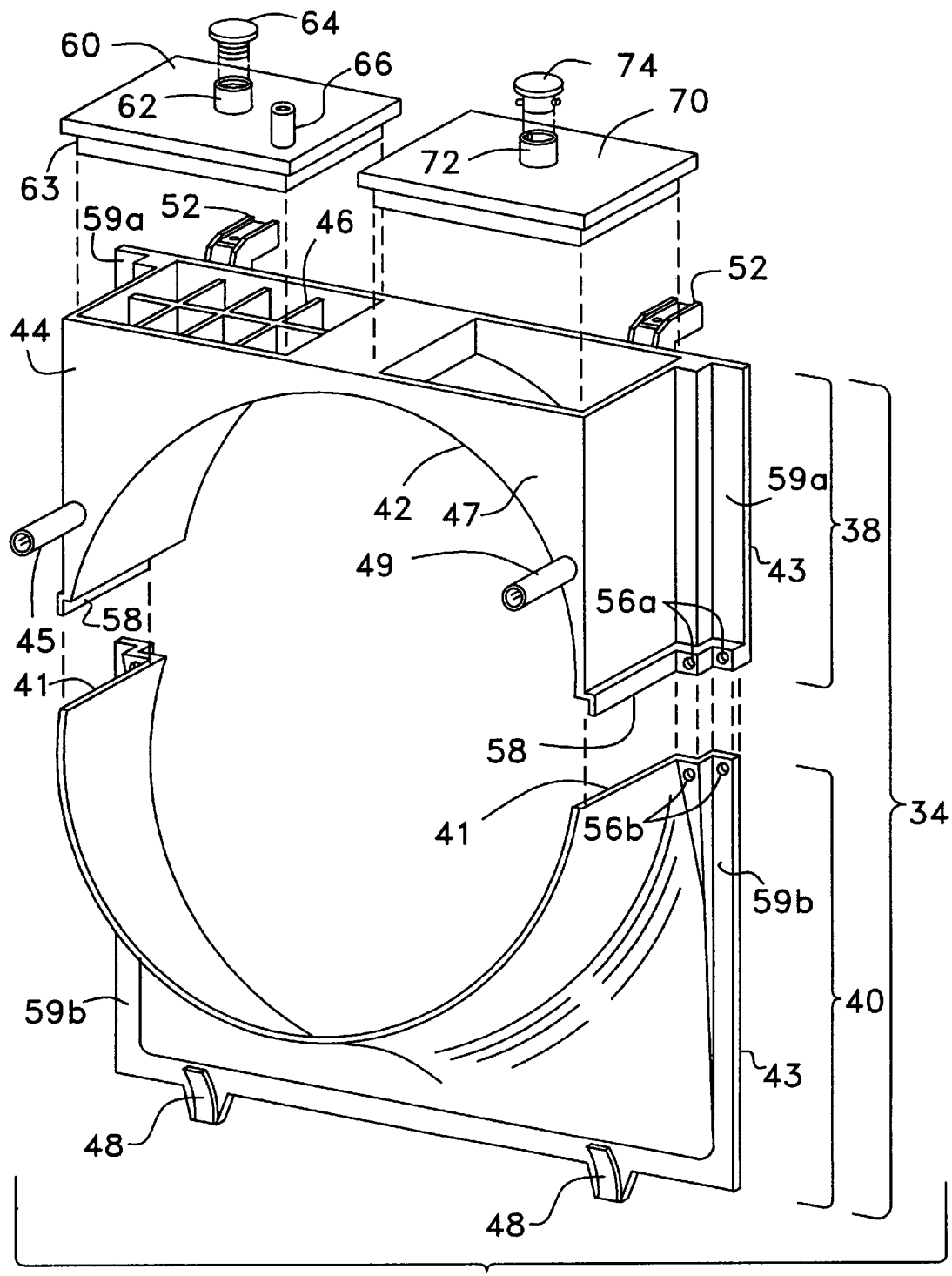
FIG. 4 is an exploded perspective view of the fan shroud and integral liquid reservoirs according to the present invention.

Referring now to FIG. 3 and FIG. 4, fan 12 is rotatably mounted about horizontal axis X—X and centrally positioned within round opening 42. Whereas cooling fan 12 is portrayed as having 4 blades, other numbers of blades, such as 3 or 5, are common. It is to be noted that fan shroud 34, mounted to radiator 18 and surrounding cooling fan 12, has a generally rectangular periphery 43 and has a substantially round opening 42 formed therein. Fan shroud 34 of the present invention is the combination of upper segment 38 and lower segment 40, each segment surrounding a respective upper and lower portion of fan 12. Upper segment 38 is formed with a downwardly extending lip 58 that engages and overlaps the upwardly extending edge 41 of lower segment 40. According to the illustrated embodiment of fan shroud 34, horizontal axis X—X of fan 12 is above horizontal mid-line Z—Z of radiator 18. It is recognized that an alternate configuration in which horizontal axis X—X coincides with or is lower than horizontal mid-line Z—Z is possible within the scope of the present invention, changing the transitional curvature from that of round opening 42 to the rectangular periphery 43 of fan shroud 34. Since the distance from round entry opening 42 to rectangular portion 43 differs from the center to the corners of lower segment 40, the degree of curvature also will vary. As seen best in FIG. 2, the curvature of lower portion 34b assists in drawing the air flow from the lowest parts of radiator 18 past fan 12.

As shown in FIGS. 3 and 4, upper segment 38 and lower segment 40 have matching mounting holes 56a and 56b that are formed in flanges 59a and 59b respectively so that fan shroud 34 becomes a complete ring when it is assembled in the automotive engine compartment. In the preferred embodiment, flanges 59a and 59b are configured as stepped dual flanges for maximizing the stability of the assembled upper segment 38 and lower segment 40 of fan shroud 34. Additional assembly brackets 52 are also provided for connection to engine compartment braces (not shown). A pair of spring tabs 48 is provided at the lower border of lower half 40 for engagement with a complementary pair of sockets (not shown) for mounting purposes.

The present invention recognizes that it is preferable to utilize the substantially triangular space radially outward of the periphery of fan 12, particularly those in upper segment 38. A first liquid reservoir 44 and a second liquid reservoir 47 are advantageously formed respectively at the upper triangular corner portions to benefit from the available space. First liquid reservoir, for example degas chamber 44 for engine coolant liquid, is formed with a set of internal baffles 46 that are configured in a matrix pattern as is known in the trade. Baffles 46 extend from a height marginally below the uppermost wall height of degas chamber 44 to its curved bottom. A reservoir cover 60, configured to be mounted in sealing engagement within the top periphery of liquid reservoir 44 has a downwardly extending peripheral lip 63 that contacts the upper ends of baffles 46 when assembled, leaving a gap between baffles 46 and the horizontal planar surface of cover 60. This gap over baffles 46 and below cover 60 allows the cells formed by baffles 46 to transfer pressure and fluids from one to the other. Cover 60 is formed with a filler neck 62 that is threaded to receive a complementarily threaded cap 64. Reservoir cover 60 is fixedly assembled into reservoir 44 by ultrasonic welding or other available means. An upper hose nipple 66 and a lower hose nipple 45 are provided for connecting hoses to allow excess coolant to flow to and from radiator 18, as is known in the trade.

Referring further to FIG. 3, second liquid reservoir 47, for example a windshield washer reservoir, is formed as an internally unrestricted bottle in a substantially triangular cross sectional shape to fully utilize the available corner space. Reservoir cover 70 is separately formed with filler neck 72 and a separate cap 74. Upon assembly, cover 70 is affixed, for example by ultrasonic welding, into the upper opening of second liquid reservoir 47. Hose nipple 49 is provided at the rear wall of second liquid reservoir 47 for drawing windshield washer fluid for use when required.

Whereas fan shroud 34 of the present invention is illustrated as being a ring that is split along a horizontal diameter, other configurations of two or more parts are possible within the scope of the invention. For example, a fan shroud divided into two substantially equal side-by-side segments along a vertical diameter is a feasible option. Also, the fan shroud of the present invention could be formed of two upper side-by-side quarter segments and a lower half segment that are assembled to form a ring as they are mounted into the automotive engine compartment. It is recognized that forming fan shroud 34 of the present invention in multiple parts simplifies the assembly of components in the engine compartment by permitting the fan and radiator to be installed before installing the fan shroud. Similarly, access to forward engine components, e.g. the water pump, is substantially simplified by the ability to remove upper segment 38 of fan shroud 34.

The preferred process for making the fan shroud of the invention is by injection molding of plastics resin. A resin of choice is polypropylene, available from numerous sources. Other types of resin as are known may be substituted according to design specifications. To maintain upper segment 38 so it is able to transmit light, i.e., to be translucent for liquid level visibility, upper segment 38 is made of unfilled natural polypropylene resin. In the discretion of the designer, upper segment 38 could be made of a plastics resin that cools to be transparent. Since lower segment 40 is not intended to transmit light, lower segment 40 is made of a reinforced polypropylene resin, for example, polypropylene with approximately 40% talcum powder, to improve its strength and rigidity. Reservoir covers 60 and 70 and their respective caps 64 and 74 can be made either with filled or unfilled polypropylene resin.

The process of injection molding involves use of a mold that is divided along a selected parting line. A liquid material, such as a plastics resin, is introduced into the closed mold and caused to solidify. The mold for producing lower segment 40 of fan shroud 34 can be configured to divide either vertically or horizontally, as referring to the orientation shown in the figures. The mold for producing upper segment 38 is preferably configured to divide along a horizontal line at the top surface of fan shroud 34 with a perpendicularly acting cam provided to form hose nipples 45 and 49 as well as mounting holes 56a. The fan shroud produced as described will be formed in completed condition with a minimum of manual labor.

While the invention has been described with reference to specific embodiments thereof, it will be appreciated that numerous variations, modifications, and enhancements are possible and are therefore regarded as being within the spirit and scope of the invention that is only limited by the claims to follow.

What is claimed is:

1. A fan shroud configured for drawing a fan generated air flow through a radiator residing in an automotive engine compartment, said fan shroud comprising:
   (a) a first segment formed to surround a first portion of said fan;
   (b) a second segment formed to surround a second portion of said fan, said second segment assembled to said first segment such that said assembled first and second segments form a fan shroud;
   (c) a first liquid reservoir integrally formed with said first segment at a position radially outward of the periphery of said fan; and
   (d) internal baffles formed within said first liquid reservoir.

2. The fan shroud as claimed in claim 1 wherein said first liquid reservoir is formed of a material capable of transmitting light.

3. The fan shroud as claimed in claim 1, further comprising a second liquid reservoir integrally formed with said first segment at a position radially outward of the periphery of said fan.

4. The fan shroud as claimed in claim 3 wherein said second liquid reservoir is formed of a material capable of transmitting light.

5. The fan shroud as claimed in claim 1, further comprising a second liquid reservoir integrally formed with said second segment at a position radially outward of the periphery of said fan.

6. The fan shroud as claimed in claim 5 wherein said second liquid reservoir is formed of a material capable of transmitting light.

7. The fan shroud as claimed in claim 3, further comprising a cover for each of said first and second liquid reservoirs having means to input liquid therethrough.

8. The fan shroud as claimed in claim 5, further comprising a cover for each of said first and second liquid reservoirs.

9. A fan shroud configured for drawing a fan generated air flow through a radiator residing in an automotive engine compartment, said fan shroud comprising:
   (a) a ring configured so as to substantially conform to the periphery of said fan;
   (b) a liquid reservoir integrally formed with said ring at a position radially outside the periphery of said fan and having a plurality of baffles formed therewithin; and
   (c) a cover fixedly assembled to substantially close said liquid reservoir and having an opening formed therein for liquid addition.

10. The fan shroud as described in claim 9, wherein said liquid reservoir is formed of a light transmissive material.

11. A fan shroud configured for drawing a fan generated air flow so that said air flow passes through and cools an adjacent radiator, said fan shroud comprising:
   (a) an upper segment extending accurately upward substantially from a horizontal diameter of said fan and having a horizontal top surface extending in a direction parallel to an axis of said fan for a selected distance over and around said fan and incorporating at a first upper corner thereof a first liquid reservoir and incorporating at a second upper corner thereof a second liquid reservoir;
   (b) each said first and second reservoirs having connections thereto for filling and removing a liquid, said first liquid reservoir having a baffle therewith;
   (c) a lower segment extending arcuately downward substantially from said horizontal diameter of said fan; and
   (d) said upper segment and said lower segment being adapted for assembling to each other to form a ring.

12. The fan shroud as claimed in claim 11 wherein said upper segment is formed of a material capable of transmitting light.

13. A method for producing a fan shroud configured for drawing an air flow generated by a fan through a radiator residing in an automotive engine compartment wherein said shroud comprises at least one integrally formed liquid reservoir, said shroud formed in a plurality of segments, said method comprising the steps of:
   (a) molding a first shroud segment including an integral liquid reservoir having a baffle formed therewithin;
   (b) molding a second shroud segment that is configured to matingly assemble to said first shroud segment so as to form said fan shroud;
   (c) molding a cover configured to close said liquid reservoir;

(d) assembling said cover to said liquid reservoir; and (e) assembling said first and second fan shroud segments to each other to form said fan shroud.

14. The method for producing a fan shroud as described in claim 13, wherein said step of assembling said cover to said liquid reservoir comprises sealingly assembling said cover into an open top of said liquid reservoir.

15. The method for producing a fan shroud as described in claim 14, wherein said step of sealingly assembling said cover comprises ultrasonically welding said cover to said liquid reservoir.

16. The method for producing a fan shroud as described in claim 13, further comprising the step of enabling said first shroud segment to be removed for servicing while said second shroud segment remains in place.

17. The method for providing a fan shroud as described in claim 11, further comprising the step of integrally molding a second liquid reservoir into said first shroud segment.

18. A method for producing a fan shroud configured for drawing an air flow generated by a fan through a radiator residing in an automotive engine compartment wherein said shroud comprises at least one integrally formed liquid reservoir, said shroud formed in a plurality of segments, said method comprising the steps of:

(a) molding a first shroud segment including an integral liquid reservoir;

(b) molding a second shroud segment that is configured to matingly assemble to said first shroud segment so as to form said fan shroud;

(c) molding a cover configured to close said liquid reservoir;

(d) assembling said cover to said liquid reservoir;

(e) assembling said first and second fan shroud segments to each other to form said fan shroud; and (f) enabling said first shroud segment to be removed for servicing while said second shroud segment remains in place.

19. The method for producing a fan shroud as described in claim 18, wherein said step of sealingly assembling said cover comprises ultrasonically welding said cover to said liquid reservoir.

20. A fan shroud configured for drawing a fan generated air flow so that said air flow passes through and cools an adjacent radiator, said fan shroud comprising:

(a) a substantially annular member configured for mounting to said radiator and having an inner diameter adapted to circumferentially surround a fan;

(b) a liquid reservoir formed integrally with said annular member; and (c) internal baffles formed within said liquid reservoir.

* * * * *

UNITED STATES PATENT AND TRADEMARK OFFICE
CERTIFICATE OF CORRECTION

PATENT NO. : 6,189,492 B1
DATED : February 20, 2001
INVENTOR(S) : Daniel J. Brown It is certified that error appears in the above-identified patent and that said Letters Patent is hereby corrected as shown below:

Column 1,
Line 43, correct "Modem" to read -- Modern --.

Signed and Sealed this

Twenty-eighth Day of August, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,189,492 B1
DATED : February 20, 2001
INVENTOR(S) : Daniel J. Brown It is certified that error appears in the above-identified patent and that said Letters Patent is hereby corrected as shown below:

<u>Title page,</u>
Item [73], Assignee correct "Molder" to read -- Molders --

Signed and Sealed this

Twenty-eighth Day of January, 2003

JAMES E. ROGAN
*Director of the United States Patent and Trademark Office*